G. T. BECKETT.
WASHER.
APPLICATION FILED OCT. 17, 1914.

1,146,917.

Patented July 20, 1915.

Witnesses:—

Inventor
Gilbert Tavernier
by Beckett

Attorney

UNITED STATES PATENT OFFICE.

GILBERT T. BECKETT, OF TUNBRIDGE WELLS, ENGLAND.

WASHER.

1,146,917.  Specification of Letters Patent.  Patented July 20, 1915.

Application filed October 17, 1914.  Serial No. 867,246.

*To all whom it may concern:*

Be it known that I, GILBERT TAVERNIER BECKETT, a subject of the King of Great Britain and Ireland, residing at 108 St. James' Park, Tunbridge Wells, Kent, England, have invented certain new and useful Improvements in Washers, of which the following is a specification.

This invention relates to a washer intended to facilitate the separation or detachment of machine parts.

Nuts and machine fittings which have necessarily to be tightly secured in position, and which frequently are more tightly secured in the action of the machine on which they are fitted, are frequently difficult to unfasten or remove, and it is the object of the present invention to provide a washer between the locking faces of nuts and machine fittings which can be completely removed from its position by unwinding, so as thus to release the tension exercised between the adjacent parts, and thus to permit of the easy unfastening or removal of the nuts or fittings.

The invention accordingly consists in the provision of such a washer made of metal strip in the form of convolutions of a strip or strips advantageously of flat section, wound so as to form a flat faced washer adapted to fit between the faces of the respective parts which it is necessary to tightly fasten in position, the material of the strip being of such tenacity that the washer can be unwound while under the pressure of tightened parts.

A washer according to the invention is illustrated in the accompanying drawings, in which—

Figure 1:
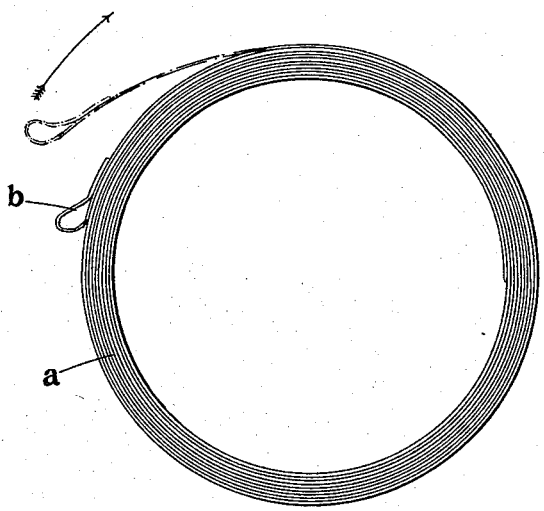
Figure 2:

Figure 1 represent in plan a washer provided according to the invention, and Fig. 2 an elevation corresponding thereto.

In carrying the invention into effect, I provide the washer from a strip or strips or band $a$ or bands of metal, such as steel. I advantageously wind the strip upon a mandrel of a diameter corresponding to the internal diameter of the washer to be formed, and I wind the strip to the extent necessary to form a washer of the desired width of face. The end of the strip I may form into a loop $b$, which is of such size and shape that it may be engaged by means of a hooked or other tool so that the strip may be unwound. The convolutions of the strip need not necessarily be connected together, but I may secure the convolutions together on one face or the other, or on both faces, or completely between the convolutions, or again at particular positions by such means as solder. In the use of such a washer it is possible to release the tension between the adjacent parts between which it is interposed, by unwinding the strip completely whereby the unfastening or removal of the parts is facilitated. I may braze or otherwise fasten the free end of the strip forming the loop at $b$ so as to preclude the loop opening on its being pulled.

It will be understood that the invention is of general and wide application, as for example, in the fitting of pulleys, free-wheels, brake-drums, chain sprockets and gear wheels; and further that its utility is not limited to any particular section of the strip or strips, used, a flat section is, however, in general preferred, but a circular section, or any other section may be used, so long as it is possible to unwind the strip in the manner described. Further, instead of a loop, any other suitable means of engaging the free end of the strip may be employed. Or the end of the strip, or strips, may be left plain and without provision for any particular means or method of unwinding. Or again, if necessary provision may be made for unwinding the washer from either end, viz., from the inside or outside.

I am aware that it has before been proposed to manufacture washers and adapters for tubes from strips of paper, cloth or other flexible material wound upon a mandrel, and adapted to be adjusted in size to the article to which it is applied by the removal of several turns from the inner or outer end of the strip.

I claim:

1. A washer formed of a rolled strip of metal, and means for securing the respective convolutions together to form a rigid and integral metallic washer, substantially as described.

2. A washer formed of a rolled strip of metal, and solder, by means of which the convolutions are connected together to form a rigid and integral metallic washer, substantially as described.

3. A washer formed of a rolled strip of metal, the convolutions of which are connected together to form a rigid and integral metallic washer, and means by which the end of the outermost convolution can be engaged for unrolling the strip for the removal of the washer from its position of use, substantially as described.

GILBERT T. BECKETT.

Witnesses:
WILLIAM EDWARD EVANS,
JOHN THOMAS BUSH.

Copies of this patent may be obtained for five cents each, by addressing the "Commissioner of Patents, Washington, D. C."